3,111,511
POLYMERIZATION OF ETHYLENE WITH ALUMINUM ALKYL-RARE EARTH HALIDE CATALYSTS
Palmer B. Stickney, Columbus, Ohio, assignor, by mesne assignments, to W. R. Grace & Co., New York, N.Y., a corporation of Connecticut
No Drawing. Filed Apr. 6, 1959, Ser. No. 804,143
6 Claims. (Cl. 260—94.9)

This invention is directed to the polymerization of ethylene. More specifically it pertains to a novel polymerization catalyst consisting essentially of an anhydrous halide of the rare earth elements in combination with an aluminum tri (lower) alkyl. By rare earth elements is meant elements of atomic numbers 57–71 inclusive in the periodic table.

It is known to prepare olefins ranging from butene up to low density, low-melting polyethylene waxes by polymerizing ethylene using aluminum trialkyl as the sole catalyst. (See U.S. Patent 2,699,457, Ziegler et al.)

I have now found that the use of a catalyst consisting essentially of an anhydrous halide of a rare earth element in combination with an aluminum alkyl e.g., triethyl aluminum results in forming solid ethylene polymers having a melting point of about 133–134° C., and a density of about 0.96.

Summarily the invention is directed to a novel method of synthesizing ethylene polymers by subjecting ethylene in a liquid hydrocarbon reaction medium under superatmospheric pressure to the action of a catalyst consisting essentially of an anhydrous halide of a rare earth element in combination with an aluminum tri (lower) alkyl.

Although the aluminum tri (lower) alkyl used in all the examples was aluminum triethyl, the aluminum tri (lower) alkyls in general are operative with anhydrous halides of the rare earth elements to catalyse the polymerization of ethylene by the process of this invention. Such other aluminum trialkyls include trimethyl, tripropyl, triisopropyl, tributyl, triisobutyl, triamyl, triisoamyl, trihexyl, triisohexyl, triheptyl and trioctyl aluminum.

In practicing this invention it has been found that ethylene partial pressures in the range 100–1500 p.s.i. or higher are operable to cause the polymerization reaction to proceed. Preferably, however, ethylene partial pressures of 500–1000 p.s.i. are used. Although the reaction can be carried out at relatively high pressures, e.g., 5000–10,000 p.s.i., and higher, the additional expense of equipment required to withstand such pressures in general outweighs the increased yields and/or shorter reaction times.

For practical purposes, a reaction temperature in the range of 40–250° C. and ethylene partial pressures in the range 500–1000 p.s.i. are preferred. For example, a temperature range of 50–100° C. using ethylene partial pressures of 500–1000 p.s.i. will give good results. Under these conditions, polyethylene having a melting point of 133–134° C., a density of 0.96, and a low melt index is produced. At higher temperatures, the melting point of the polyethylene formed is slightly decreased and the melt index increased. Thus, it may be seen that variation in reaction temperature is a means of preparing a series of polyethylenes having different physical properties. Other means of varying the polymer molecular weight and crystallinity will be obvious to those skilled in the art.

As a reaction medium, substantially any inert material can be used which is liquid under the conditions of temperature and pressure employed and which is free of contaminants which retard or inhibit the polymerization reaction or have an adverse effect on the catalyst activity. Such contaminants include moisture, oxygen, carbon dioxide, active hydrogen containing material and the like. A liquid hydrocarbon reaction medium in which the ethylene monomer will dissolve is preferred e.g., pentane, heptane, hexane, cyclohexane, octane, benzene, xylene, toluene and the like.

The amount of catalyst is not critical. Relatively small amounts are operable to form relatively large amounts of polyethylene. In general, a practical range is 0.005 to 0.05 gram catalyst per gram of ethylene polymerized. Even larger amounts of catalyst are operable, but present a purification problem.

The ratio of the anhydrous rare earth halide to the aluminum trialkyl is not critical. Mole ratios of anhydrous rare earth halide:aluminum trialkyl of 1:1 to 1:10 are operative; a preferred range is 1:1 to 1:5.

For best results the anhydrous rare earth halide should be prepared, stored and transferred to the polymerization reactor under an inert atmosphere to insure that its catalytic activity is not impaired. The noble gases, especially argon, and also lamp grade nitrogen are preferred as an inert atmosphere.

The crude ethylene polymer obtained by the practice of this invention may be purified and recovered by techniques well known in the art. For example, the crude polymer may be refluxed with alcoholic acids, e.g., HCl-methanol, followed by filtration and drying.

The following examples will aid in understanding the invention but do not limit its scope.

*Example 1*

Ethylene was compressed into a 300 ml. stainless steel rocking autoclave containing 100 ml. of hexane, 0.01 mole $SmCl_3$, and 0.01 mole triethylaluminum. The catalyst components were added to the solvent under an inert nitrogen atmosphere. The autoclave was heated at 75° C. for 7 hours. During the reaction, the ethylene inlet was left connected to the autoclave and the ethylene partial pressure was maintained at about 650 p.s.i. At the end of the 7-hour period, the ethylene feed was discontinued and the autoclave cooled and its contents transferred to a beaker containing methanol-hydrochloric acid solution, where it was boiled to dissolve impurities. The mixture was cooled and the resultant purified polyethylene was filtered and dried. The dry product weighed 18 grams and had the physical characteristics of high-density polyethylene.

*Example 2*

The procedure of Example 1 was followed, except that the reaction temperature was 100° C. and the ethylene partial pressure was 600 p.s.i. At the end of a 7-hour reaction period, 15 g. of polyethylene having a melting point of 133–134° C. was obtained.

*Example 3*

The procedure of Example 1 was followed, except that the reaction temperature was 50° C. and the ethylene partial pressure was maintained at 500 p.s.i. At the end of a 7-hour reaction period, 8 g. of polyethylene was obtained which had a melting point of 133–134° C., and a density of 0.96.

*Example 4*

The procedure was the same as Example 1, except that 0.01 mole $SmCl_2$ was substituted for the $SmCl_3$ and a pressure at 800 p.s.i. was maintained. At the end of a 7-hour reaction period, 13 g. of high-density polyethylene was obtained.

*Example 5*

The procedure was the same as Example 1, except that 0.01 mole of $SmCl_2$ was substituted for $SmCl_3$, the reaction temperature was 50° C., and the ethylene partial pressure was 500 p.s.i. After 7 hours, 9 g. of high-density polyethylene was isolated.

*Example 6*

The procedure was the same as Example 1, except that 0.01 mole YbCl$_3$ was substituted for SmCl$_3$. After 7 hours, 10 g. of polyethylene melting at 133–134° C. and having a density of 0.96 was isolated.

*Example 7*

The procedure was the same as Example 1, except that 0.01 mole YbCl$_2$ was substituted for SmCl$_3$. After 8 hours, 11 g. of high-density polyethylene was obtained.

*Example 8*

The procedure was the same as Example 1, except that 0.01 mole YbCl$_3$ was substituted for SmCl$_3$ and the polymerization was carried out at 50° C. under an ethylene partial pressure of 700 p.s.i. After a 12-hour reaction period, 12 g. of high-density polyethylene was isolated.

*Example 9*

The procedure was the same as Example 1, except that 0.01 mole YbCl$_2$ was substituted for SmCl$_3$, the reaction temperature was 50° C., and the ethylene partial pressure was 500 p.s.i. After a 12-hour reaction period, 8 g. of high-density polyethylene having a melting point of 133–134° C. was isolated.

*Example 10*

The procedure was the same as Example 1, except that YbCl$_2$ was substituted for SmCl$_3$, the reaction temperature was 100° C. and the reaction pressure 600 p.s.i. After a 22 hour reaction period the bomb was cooled, opened and purification conducted in the usual way. A product weighing 10 g. and having a melting point of 134–135° C. was isolated.

*Example 11*

The procedure of Example 1 was followed except that 0.01 mole of SmCl$_2$ was substituted for SmCl$_3$ and 0.03 mole of triethyl aluminum was used. The reactor was heated to 75° C. and ethylene repressured as needed to maintain a pressure of 800 p.s.i. After about 18 hours the bomb was opened and the customary purification conducted. A product weighing 26 g. and melting 132–133° C. was isolated.

*Example 12*

The procedure of Example 1 was followed except that 0.01 mole of YbCl$_2$ was substituted for SmCl$_3$ and 0.03 mole of triethyl aluminum was used. After reacting for 17 hours at 75° C. with the ethylene pressure maintained about 800 p.s.i. by repressuring, the bomb was cooled, opened and the contents purified by the usual method. The purified product weighed 27 g. and had a M.P. 132–134° C.

*Example 13*

The procedure of Example 1 was followed except 0.01 mole of YbCl$_3$ was substituted for the SmCl$_3$ and the reaction pressure was about 800 p.s.i. After 17 hours, the reaction was discontinued and the bomb contents given the usual purification treatment. The product isolated weighed 20 g. and melted 132–134° C.

The uses of the polyethylene of this invention are analogous to those prepared by prior procedures. Its high resistance to stress cracking and good creep properties make it especially suitable for use in pipe and tubing using substantially the same equipment and technique customary for the solid polyethylenes of the prior art.

I claim:

1. The process of polymerizing ethylene that comprises subjecting ethylene in a liquid hydrocarbon reaction medium to the action of a catalyst consisting essentially of an aluminum trialkyl wherein the alkyl groups contain 1 to 8 carbon atoms and an anhydrous member of the group consisting of SmCl$_2$, SmCl$_3$, YbCl$_2$ and YbCl$_3$.

2. The process according to claim 1 wherein the mole ratio of aluminum trialkyl to said group member is 1 to 10:1 respectively.

3. The process according to claim 1 wherein the aluminum trialkyl is aluminum triethyl.

4. The process of polymerizing ethylene that comprises subjecting ethylene in a hexane reaction medium at a partial pressure of 500–1000 p.s.i. ethylene and a temperature of 50–100° C. to the action of a catalyst consisting essentially of an aluminum trialkyl wherein the alkyl groups contain 1 to 8 carbon atoms and an anhydrous member of the group consisting of SmCl$_2$, SmCl$_3$, YbCl$_2$ and YbCl$_3$, the mole ratio of said aluminum trialkyl to said group member being 1 to 3:1 respectively.

5. The process of forming an active catalyst for ethylene polymerization that comprises combining an aluminum trialkyl wherein the alkyl groups contain 1 to 8 carbon atoms with an anhydrous member of the group consisting of SmCl$_2$, SmCl$_3$, YbCl$_2$ and YbCl$_3$ in an aluminum trialkyl:group member mole ratio of 1 to 10:1 respectively.

6. The process of polymerizing ethylene that comprises subjecting ethylene in a liquid hydrocarbon reaction medium to the action of a catalyst consisting essentially of an aluminum trialkyl wherein the alkyl groups contain 1 to 4 carbon atoms and anhydrous SmCl$_3$.

References Cited in the file of this patent

UNITED STATES PATENTS

| | | |
|---|---|---|
| 2,921,056 | Stuart | Jan. 12, 1960 |

FOREIGN PATENTS

| | | |
|---|---|---|
| 533,362 | Belgium | May 16, 1955 |
| 563,591 | Belgium | June 28, 1958 |
| 1,134,740 | France | Dec. 3, 1956 |
| 1,147,588 | France | June 11, 1957 |